US009397906B2

(12) United States Patent
Srivastava et al.

(10) Patent No.: US 9,397,906 B2
(45) Date of Patent: Jul. 19, 2016

(54) SCALABLE FRAMEWORK FOR MONITORING AND MANAGING NETWORK DEVICES

(71) Applicant: Verizon Patent and Licensing Inc., Arlington, VA (US)

(72) Inventors: Ashok N. Srivastava, Mountain View, CA (US); Yian Xu, Los Gatos, CA (US); Yong Gao, Fremont, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 154 days.

(21) Appl. No.: 14/472,928

(22) Filed: Aug. 29, 2014

(65) Prior Publication Data

US 2016/0065428 A1    Mar. 3, 2016

(51) Int. Cl.
*G01R 31/08* (2006.01)
*H04L 12/26* (2006.01)
*H04L 12/24* (2006.01)

(52) U.S. Cl.
CPC .......... *H04L 43/065* (2013.01); *H04L 41/0686* (2013.01); *H04L 41/147* (2013.01); *H04L 43/045* (2013.01)

(58) Field of Classification Search
None
See application file for complete search history.

(56) References Cited

U.S. PATENT DOCUMENTS

| | | | | |
|---|---|---|---|---|
| 2006/0140369 | A1* | 6/2006 | Altmann | H04M 15/00 379/114.13 |
| 2008/0235611 | A1* | 9/2008 | Fraley | G06F 9/44505 715/772 |
| 2009/0138592 | A1* | 5/2009 | Overcash | H04L 63/1425 709/224 |
| 2012/0144384 | A1* | 6/2012 | Baek | G06F 11/3013 717/173 |

OTHER PUBLICATIONS

Ashok N. Srivastava et al., "Machine Learning and Knowledge Discovery for Engineering Systems Health Management", Chapman & Hall/CRC, Data Mining and Knowledge Discovery Series, 2012, 464 pages.
Ashok N. Srivastava et al., "Software health management: a necessity for safety critical systems", Innovations in Systems and Software Engineering, A NASA Journal, ISSN 1614-5046, Springer, May 22, 2013, 17 pages.
Santanu Das et al., "Detecting Anomalies in Multivariate Data Sets with Switching Sequences and Continuous Streams", National Aeronautics and Space Administration (NASA), www.nasa.gov, 2009, 1 page.
Ashok N. Srivastava et al., "Vehicle-Level Reasoning Systems: Integrating System-Wide Data to Estimate the Instantaneous Health State", Society of Automotive Engineers Integrated Vehicle Health Management Book, Ian Jennions, Ed., 2011, 12 pages.
Bryan L. Matthews et al., "Space Shuttle Main Propulsion System Anomaly Detection: A Case Study", IEEE A&E Systems Magazine, Sep. 2011, 10 pages.
Johann Schumann et al., "Toward Software Health Management with Bayesian Networks," Proceedings of the FSE/SDP workshop on Future of software engineering research, Carnegie Mellon University, Nov. 2010, 5 pages.

* cited by examiner

*Primary Examiner* — Duc C Ho

(57) ABSTRACT

A device receives information associated with network devices of a network, such as device information associated with components of the network devices, application information generated by the network devices, or network information associated with interactions of the network devices. The device performs an analysis of the information associated with the network devices via analytics techniques in near real time, and generates analysis information based on the analysis of the information associated with the network devices. The device provides the analysis information for display.

20 Claims, 14 Drawing Sheets

FIG. 5B

Network Analysis Application Configuration

Send notifications of anomalies to:

jsmith@web.com    Via: Email msg.

999-222-4567    Via: Text msg.

Provide comparison with similar devices:

Similar network devices ○

Similar services ○

Miscellaneous:

Correlate different types of data ○ Yes ○ No

Predict future behavior ○ Yes ○ No

[ Back ]    [ More Configuration ]    [ Submit ]

510, 540, 550, 560, 500

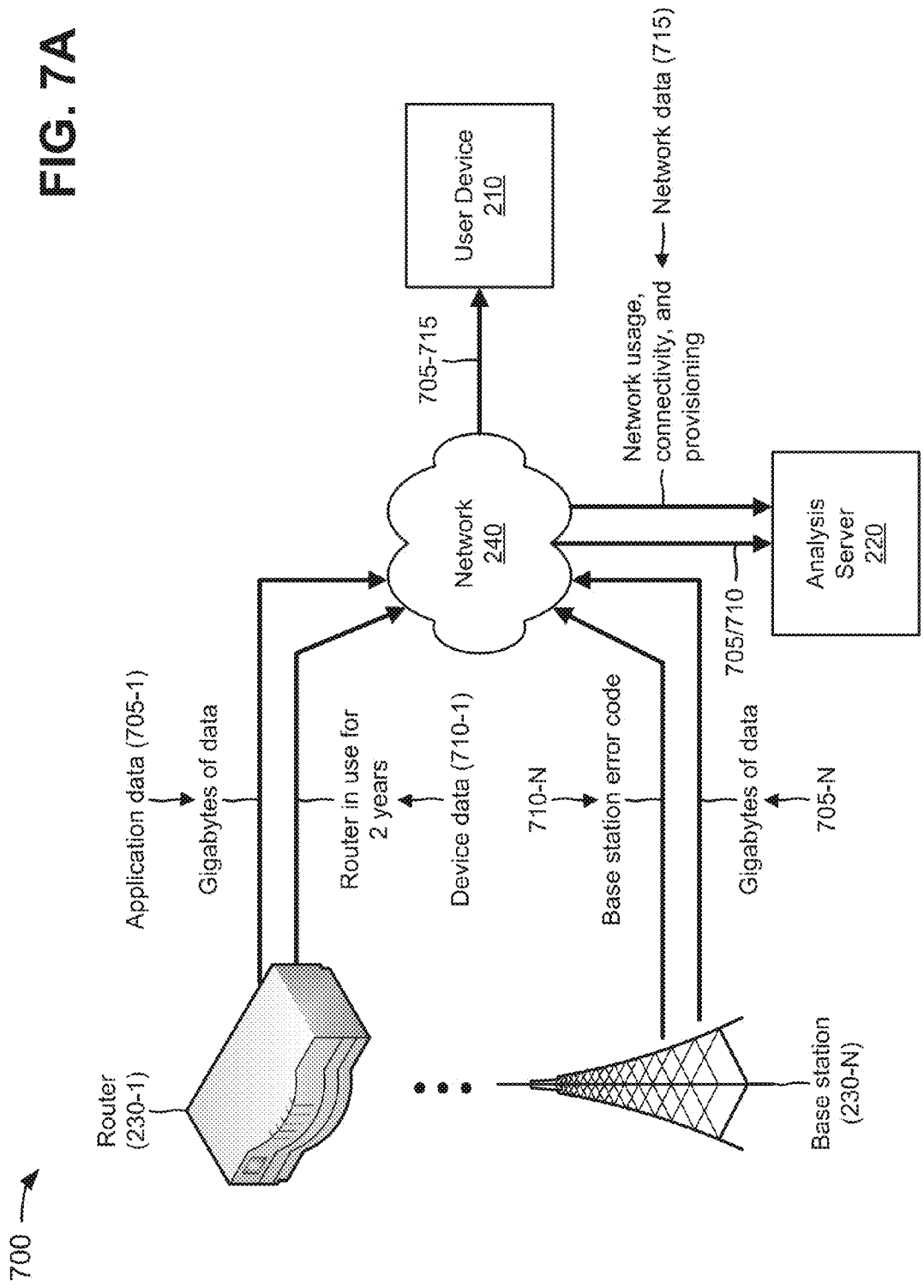

SCALABLE FRAMEWORK FOR MONITORING AND MANAGING NETWORK DEVICES

BACKGROUND

Users today utilize a variety of user devices, such as cell phones, smart phones, tablet computers, etc., to access online services (e.g., email applications, Internet services, television services, etc.), purchase products and/or services, and/or perform other tasks via networks. The networks may include wireless networks and/or wireline networks, and may include network devices, such as routers, gateways, base stations, cell towers, etc.

BRIEF DESCRIPTION OF THE DRAWINGS

FIGS. 5A and 5B are diagrams of example user interfaces that may be used in connection with the example process shown in FIG. 4;

FIGS. 7A-7G are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Today, more and more network devices are being used to form communication networks. The network devices may include, for example, a router, a gateway, a base station, a mobility management entity (MME), etc. A service provider may manage and/or operate a network and the network devices, such as, for example, a telecommunication service provider, a television service provider, an Internet service provider, a wireless service provider, etc. The service provider may perform monitoring of the network devices in order to ensure that the network devices are operating correctly. However, the monitoring of the network devices is reactive in nature and does not enable proactive monitoring and management of the network devices.

Figure 1:
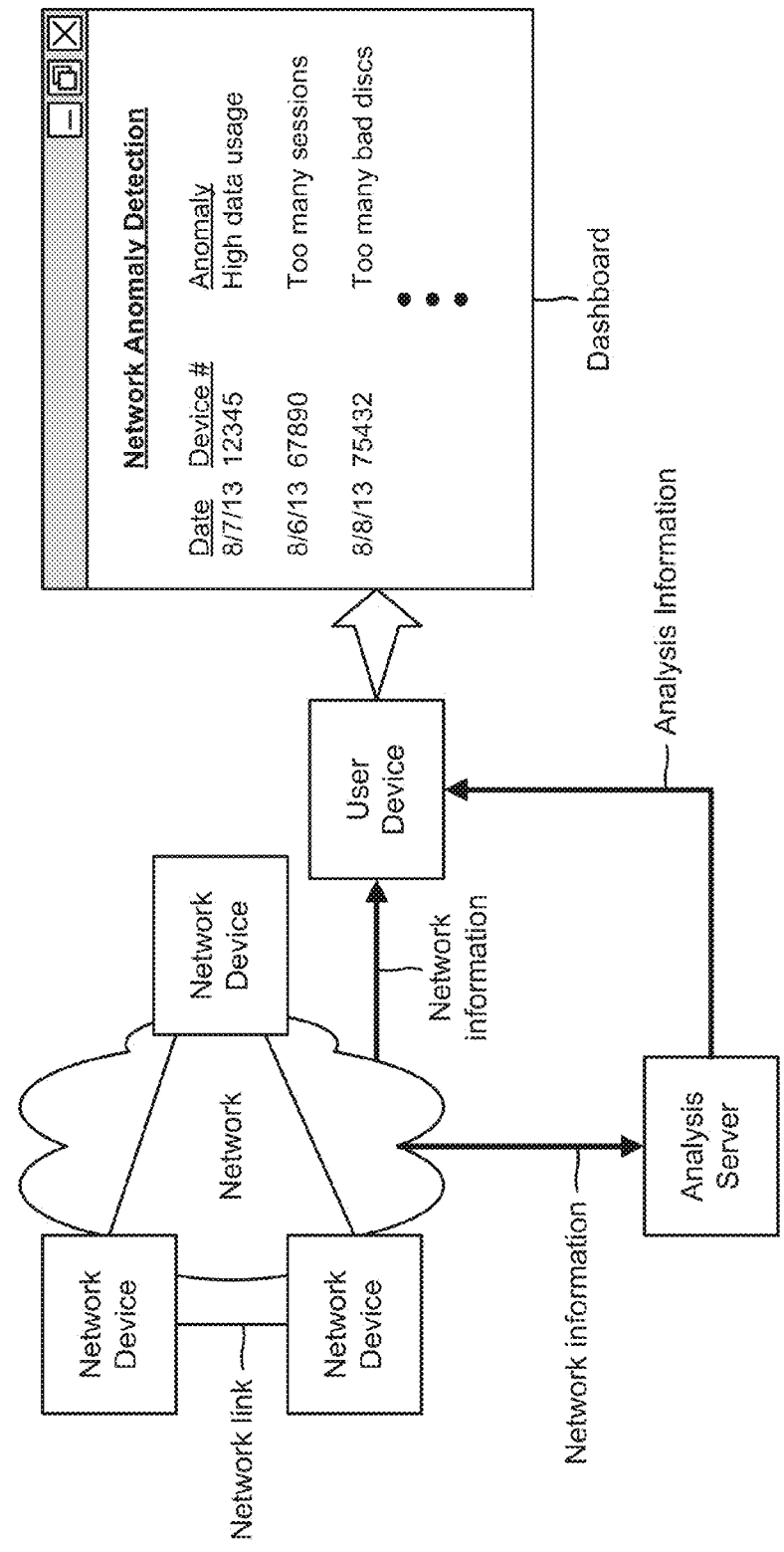
FIG. 1 is a diagram of an overview of an example implementation described herein.

FIG. 1 is a diagram of an overview of an example implementation 100 described herein. In example implementation 100, assume that multiple network devices are associated with a network. As shown in FIG. 1, the network devices may generate network information, and may provide the network information to an analysis server and/or a user device associated with the analysis server. The network information may include network data (e.g., information associated with usage, connectivity, provisioning, etc. of the network devices); device data (e.g., information associated with components of the network devices, operation of the network devices, models of the network devices, etc.); and/or application data (e.g., bandwidth information, error codes, data usage, etc.). In some implementations, the analysis server may utilize the application data to charge customers (e.g., a service provider may charge customers for use of the network).

As further shown in FIG. 1, the analysis server may receive the network information from the network devices. The analysis server may perform an analysis of the network information, in near real time (e.g., real time or approximately real time), real time, or batch time, via anomaly detection, trending, prediction, segmentation, prognostics, etc. In some implementations, the analysis server may perform a particular analysis for network information received from network devices associated with a particular customer. For example, a customer may utilize the network and particular network devices to access the Internet, and the analysis server may perform an analysis for network information received from the particular network devices. As further shown in FIG. 1, the analysis server may generate analysis information based on the analysis of the network information, and may provide the analysis information, for display, to the user device.

In some implementations, the analysis server may enable an entity (e.g., the service provider) to access or receive the analysis information via the user device and/or the analysis server. For example, as shown in FIG. 1, the analysis server may provide, for display, a dashboard to the user device. The dashboard may include analysis information, such as information associated with anomalous network devices of the network. For example, as shown in FIG. 1, the dashboard may indicate that network device number "12345" is experiencing high data usage, that network device number "67890" is utilizing too many sessions, that network device number "75432" is utilizing too many bad discs, etc. Such information may enable the service provider to identify network devices that are not operating correctly, and to correct the identified network devices.

Systems and/or methods described herein may provide a framework for monitoring and managing network devices of a network, and the framework may scale to any number of network devices. The systems and/or methods may enable a service provider to manage the network devices based on an analysis (e.g., anomaly detection, diagnosis, trending, prediction, segmentations, prognostics, etc.) of information generated by the network devices. The systems and/or methods may enable the service provider to perform condition-based maintenance on malfunctioning network devices, which may significantly reduce costs for the service provider. The systems and/or methods may monitor the network devices for the service provider, which may also reduce costs for the service provider.

As used herein, the term user is intended to be broadly interpreted to include a user device, or a user of a user device. The term entity, as used herein, is intended to be broadly interpreted to include a business, an organization, a government agency, a user device, a user of a user device, etc.

Figure 2:
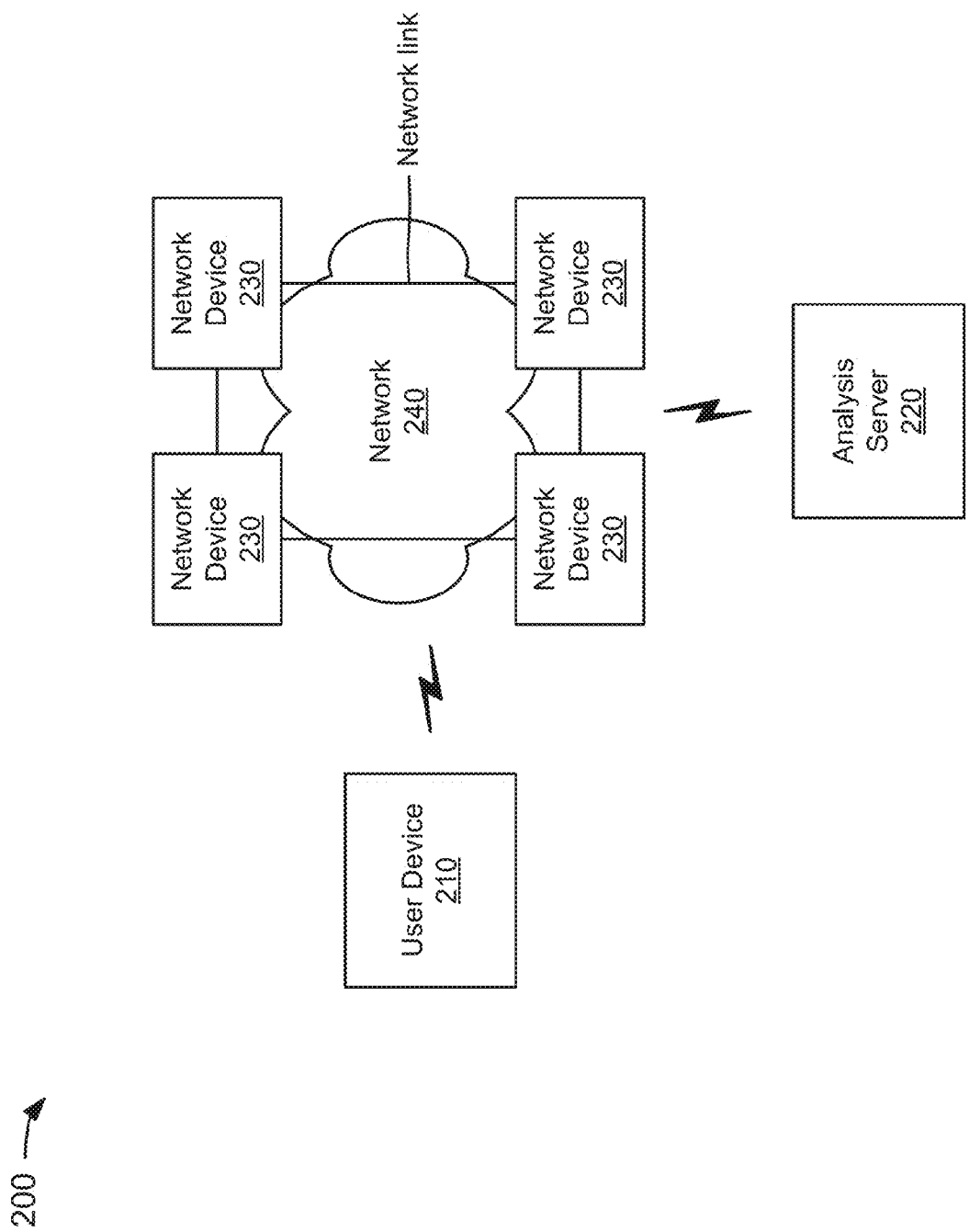
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, an analysis server 220, network devices 230, and a network 240. Devices/networks of environment 200 may interconnect via wired connections, wireless connections, or a combination of wired and wireless connections.

User device 210 may include a device that is capable of communicating over network 240 with analysis server 220. In some implementations, user device 210 may include a radiotelephone; a personal communications services (PCS) terminal that may combine, for example, a cellular radiotelephone with data processing and data communications capabilities; a smart phone; a configured television; a laptop computer; a tablet computer; a global positioning system (GPS) device; a gaming device; a set-top box (STB); or another type of computation and communication device. In some implementations, user device 210 may be associated with a service provider that manages and/or operates network 240, such as, for example, a telecommunication service provider, a television service provider, an Internet service provider, a wireless service provider, etc.

Analysis server 220 may include one or more personal computers, one or more workstation computers, one or more server devices, one or more virtual machines (VMs) provided in a cloud computing environment, or one or more other types of computation and communication devices. In some implementations, analysis server 220 may be associated with an entity that manages and/or operates network 240, such as, for example, a telecommunication service provider, a television service provider, an Internet service provider, etc.

In some implementations, analysis server 220 may receive device data from network device 230 (e.g., information associated with operation of network device 230, a model of network device 230, error(s) generated by network device 230, etc.); application data from network device 230 (e.g., information output by network device 230, such as, bandwidth information, usage information, etc.); and/or network data from network devices 230 and/or network 240 (e.g., information associated with usage, connectivity, provisioning, etc. of network devices 230 and/or network 240). In some implementations, a device may be provided in network 240 to detect the device data, the application data, and/or the network data, and to provide the detected data to analysis server 220. Analysis server 220 may perform an analysis of the received data, in near real time, real time, or batch time, via anomaly detection, trending, prediction, segmentation, etc. In some implementations, analysis server 220 may generate analysis information based on the analysis of the received data, and may provide the analysis information, for display, to user device 210.

In some implementations, a service provider may utilize the analysis information to proactively correct any problems with network devices 230 and/or network 240. For example, if the device data includes information indicating that network device 230 is experiencing an error, the service provider may utilize the information to instruct a technician associated with the service provider to check and correct network device 230.

Network device 230 may include a device that is capable of communicating with user device 210, analysis server 220, and/or other network devices 230. In some implementations, network device 230 may include a gateway, a router, a switch, a firewall, a network interface card (NIC), a hub, a bridge, a proxy server, an optical add-drop multiplexer (OADM), a base station, a mobility management entity (MME), a serving gateway (SGW), a policy and charging rules function (PCRF) server, and a packet data network (PDN) gateway (PGW), a home subscriber server (HSS), a call session control function (CSCF) server, or some other type of device that processes and/or transfers information associated with network 240.

Network 240 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

In some implementations, network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN). The EPC network may include an all-IP packet-switched core network that supports high-speed wireless and wireline broadband access technologies. The EPC network may allow user devices 210 to access various services by connecting to the LTE network, an evolved high rate packet data (eHRPD) radio access network (RAN), and/or a wireless local area network (WLAN). The IMS network may include an architectural framework or network (e.g., a telecommunications network) for delivering IP multimedia services. The PDN may include a communications network that is based on packet switching.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
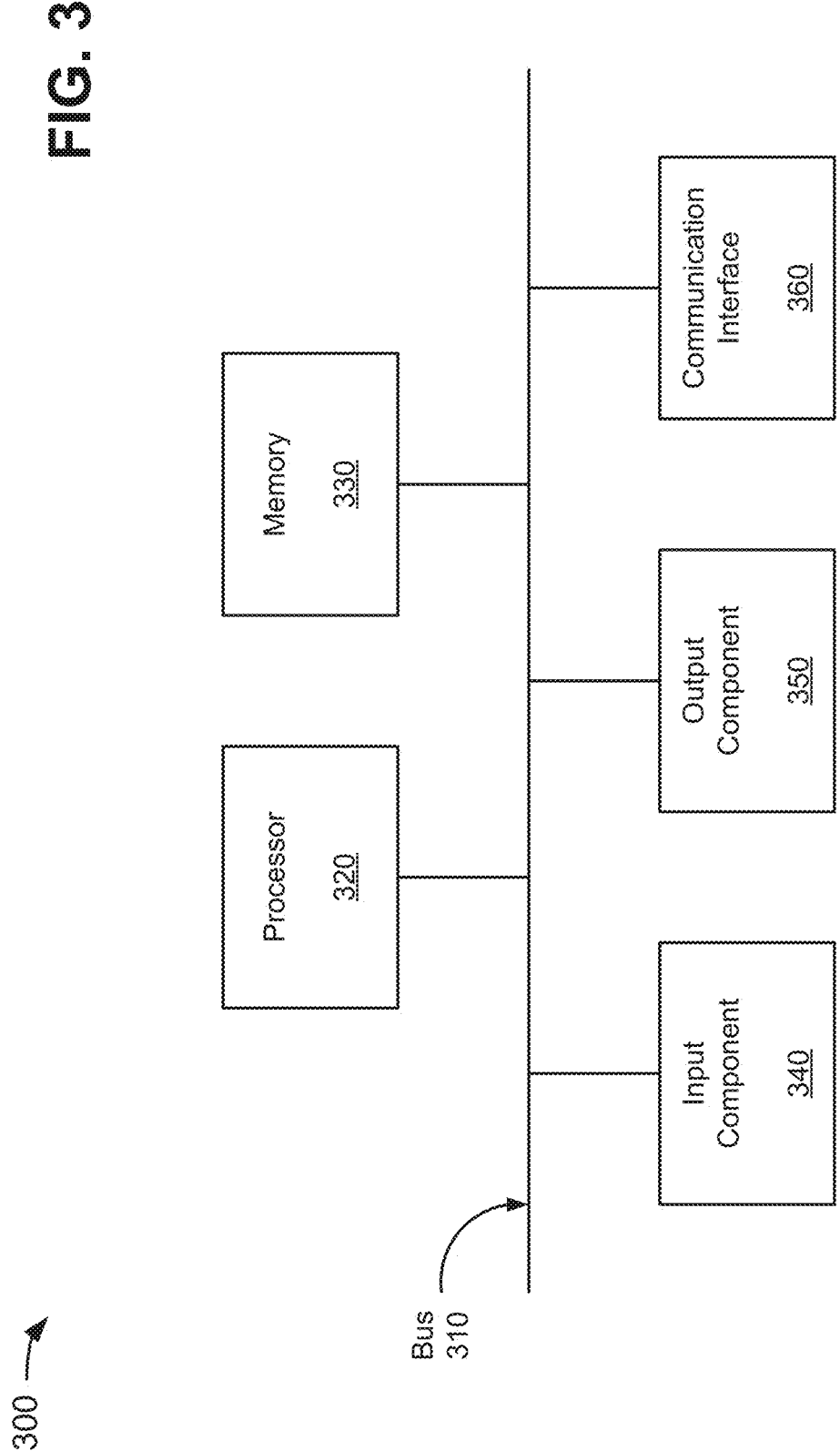
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
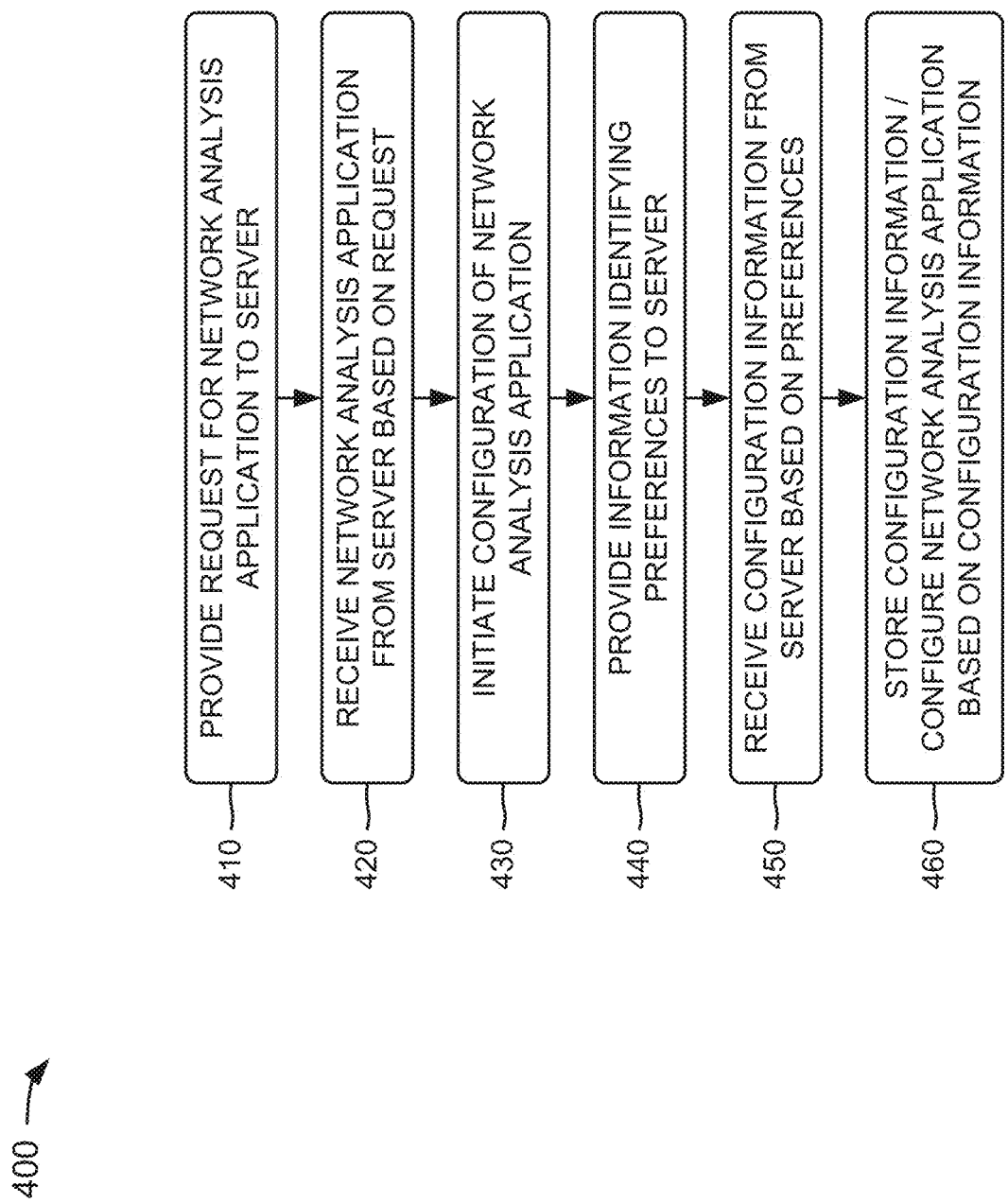
FIG. 4 is a flow chart of an example process for receiving and configuring a network analysis application for a user device.

FIG. 4 is a flow chart of an example process 400 for receiving and configuring a network analysis application for a user device. In some implementations, one or more process blocks of FIG. 4 may be performed by user device 210. In some implementations, one or more process blocks of FIG. 4 may be performed by another device or a group of devices separate from or including user device 210, such as analysis server 220.

As shown in FIG. 4, process 400 may include providing a request for a network analysis application to a server (block 410). For example, a user may cause user device 210 to provide a request for a network analysis application to analysis server 220. In some implementations, the network analysis application may include an application, a code snippet, a script, a widget, etc. that may cause user device 210 to perform one or more functions. For example, the network analysis application may enable the user to set preferences for receiving information (e.g., device data, application data, network data, etc.), associated with network devices 230, that has been analyzed by analysis server 220. In some implementations, the user may cause user device 210 to access the network analysis application via, for example, a user interface (such as a browser) provided by analysis server 220, or in another manner. The user may then select, using user device 210, information regarding the network analysis application from the user interface to cause user device 210 to provide a request for the network analysis application to analysis server 220. In some implementations, analysis server 220 may offer the network analysis application to user device 210 without user device 210 providing the request for the network analysis application.

As further shown in FIG. 4, process 400 may include receiving the network analysis application from the server based on the request (block 420). For example, user device 210 may receive the network analysis application from analysis server 220, and may store the network analysis application in a memory associated with user device 210 (e.g., memory 330, FIG. 3). In some implementations, the user, of user device 210, may establish an account associated with the network analysis application prior to or after receiving the network analysis application. In some implementations, the network analysis application may be stored in analysis server 220 (e.g., and not in user device 210), and user device 210 may access the network analysis application via the user's account.

As further shown in FIG. 4, process 400 may include initiating a configuration of the network analysis application (block 430). For example, the user may initiate the network analysis application and identify, using user device 210, one or more preferences relating to receiving information associated with network devices 230 and analyzed by analysis server 220. In some implementations, the user may identify the one or more preferences using one or more elements of a user interface provided by user device 210 and/or analysis server 220. The one or more elements may include, for example, one or more text input elements, one or more drop down menu elements, one or more checkbox elements, one or more radio button elements, and/or any other types of elements that may be used to receive information from the user.

Alternatively, or additionally, the one or more preferences may include a preference of the user with respect to the network analysis application detecting anomalies associated with network devices 230. For example, the network analysis application may detect anomalies associated with usage, connectivity, provisioning, etc. of network devices 230 and/or network 240, security associated with network devices 230 (e.g., if network device 230 is moved from a fixed location, this may indicate that network devices 230 has been stolen), application data generated by network devices 230, etc.

Alternatively, or additionally, the one or more preferences may include a preference of the user with respect to the network analysis application providing trends and/or historical information associated with network devices 230. For example, the network analysis application may determine trends and/or store historical information associated with usage, connectivity, provisioning, etc. of network devices 230 and/or network 240, security associated with network devices 230, errors generated by network devices 230, application data generated by network devices 230, etc.

Alternatively, or additionally, the one or more preferences may include a preference of the user with respect to the network analysis application sending notifications associated with anomalies detected for network devices 230. For example, the user may indicate that the network analysis application is to send notifications to the user or to others associated with user device 210 (e.g., via a text message, an email message, voicemail message, a voice call, etc.).

Alternatively, or additionally, the one or more preferences may include a preference of the user with respect to the network analysis application providing a comparison of network device 230 with similar devices. For example, the user may indicate that the network analysis application is to provide a comparison of network device 230 with other similar network devices 230, devices providing similar services as network device 230, etc.

Alternatively, or additionally, the one or more preferences may include a preference of the user with respect to the network analysis application providing miscellaneous information associated with network devices 230. For example, the user may indicate that the network analysis application is to correlate different types of data received from network devices 230, predict future behavior of network devices 230, etc.

Alternatively, or additionally, a type of the account, of the user, associated with the network analysis application may determine the quantity of preferences that the user is able to specify. For example, the network analysis application may enable the user to specify only a portion of the above preferences or specify additional preferences based on the type of the account with which the user is associated.

As further shown in FIG. 4, process 400 may include providing information identifying one or more preferences to the server (block 440). For example, the user may cause user device 210 to provide, to analysis server 220, information identifying the one or more preferences of the user and provided during the configuration of the network analysis application.

As further shown in FIG. 4, process 400 may include receiving configuration information from the server based on the preferences (block 450). For example, user device 210 may receive, from analysis server 220, configuration information that may be used to configure the network analysis application to receive information associated with network devices 230 and analyzed by analysis server 220.

In some implementations, analysis server 220 may generate the configuration information, which may be used to configure the network analysis application, based on the information identifying the one or more preferences of the user. For example, the configuration information may include information that causes the network analysis application to receive information associated with network devices 230 and analyzed by analysis server 220.

Alternatively, or additionally, the configuration information may include information that causes analysis server 220 to detect anomalies associated with network devices 230, and to provide information associated with the detected anomalies to user device 210. Alternatively, or additionally, the configuration information may include information that causes analysis server 220 to provide trends and/or historical information, associated with network devices 230, to user device 210.

Alternatively, or additionally, the configuration information may include information that causes analysis server 220 to send notifications (e.g., to other users and devices other than user device 210) associated with anomalies detected by analysis server 220 for network devices 230. Alternatively, or additionally, the configuration information may include information that causes analysis server 220 to perform a comparison of network devices 230 with similar devices, and to provide information associated with the comparison to user device 210. Alternatively, or additionally, the configuration information may include information that causes analysis server 220 to correlate different types of data received from network devices 230, predict future behavior of network devices 230, etc., and to provide the correlation and/or behavior to user device 210.

Alternatively, or additionally, the configuration information may be obtained from a data structure. In some implementations, analysis server 220 may provide, to user device 210, the configuration information independent of receiving the information identifying the one or more preferences of the user.

As further shown in FIG. 4, process 400 may include storing the configuration information and configuring the network analysis application based on the configuration information (block 460). For example, the user may cause user device 210 to store all or a portion of the configuration information received from analysis server 220. The network analysis application may be configured based on storing all or a portion of the configuration information. In some implementations, analysis server 220 may store all or a portion of the configuration information.

In some implementations, analysis server 220 may provide updates, to the configuration information, to user device 210 based on use of the network analysis application by user device 210 and/or by other user devices 210. For example, analysis server 220 may receive updates, to the configuration information, from one or more other users and may provide the received updates to user device 210. User device 210 may store the updates to the configuration information. In some implementations, analysis server 220 may provide the updates periodically based on a preference of the user and/or based on a time frequency determined by analysis server 220. In some implementations, analysis server 220 may determine whether to provide the updates based on the type of the account associated with the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
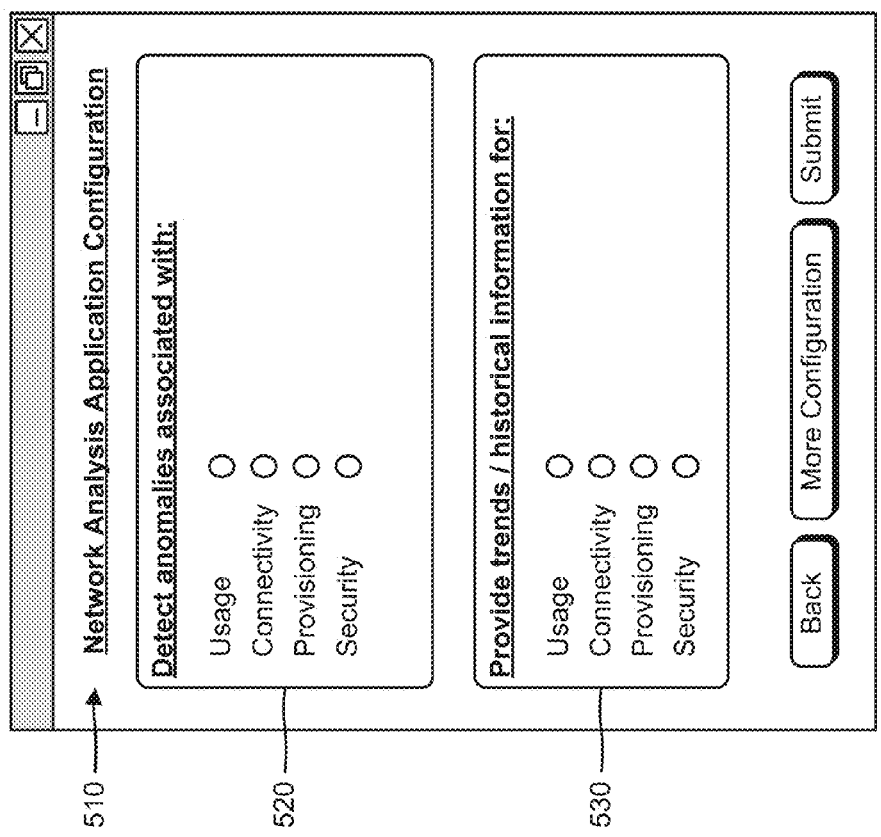

FIGS. 5A and 5B are diagrams 500 of example user interfaces that may be used in connection with example process 400 shown in FIG. 4. In some implementations, the user interfaces of FIGS. 5A and 5B may be provided by analysis server 220 to user device 210 to enable a user to identify information (e.g., preferences) that may be used to configure the network analysis application so that user device 210 receives information associated with network devices 230 and analyzed by analysis server 220.

Assume that the user has previously caused user device 210 to request and download the network analysis application or to log into an account associated with the network analysis application. Further assume that the user causes user device 210 to install the network analysis application on user device 210. When the user logs into the account or user device 210 installs the network analysis application, as shown in FIG. 5A, analysis server 220 may provide a user interface 510 to user device 210, and user device 210 may display user interface 510 to the user. User interface 510 may allow the user to configure different features of the network analysis application. For example, the user may identify preferences for detecting anomalies associated with network devices 230 in a first configuration section 520. In some implementations, the user may indicate that the user wants the network analysis application to detect anomalies associated with usage of network devices 230 and/or network 240. In some implementations, the user may indicate that the user wants the network analysis application to detect anomalies associated with connectivity to network devices 230 and/or network 240. In some implementations, the user may indicate that the user wants the network analysis application to detect anomalies associated with provisioning of network devices 230 and/or network 240. In some implementations, the user may indicate that the user wants the network analysis application to detect anomalies associated with security of network devices 230, application data generated by network devices 230, etc.

As further shown in FIG. 5A, the user may identify preferences for providing trends and/or historical information, associated with network devices 230, in a second configuration section 530. In some implementations, the user may indicate that the user wants the network analysis application to provide trends and/or historical information associated with usage of network devices 230 and/or network 240. In some implementations, the user may indicate that the user wants the network analysis application to provide trends and/or historical information associated with connectivity to network devices 230 and/or network 240. In some implementations, the user may indicate that the user wants the network analysis application to provide trends and/or historical information associated with provisioning of network devices 230 and/or network 240. In some implementations, the user may indicate that the user wants the network analysis application to provide trends and/or historical information associated with security of network devices 230, application data generated by network devices 230, etc.

As shown in FIG. 5B, the user may identify preferences for sending notifications about anomalies, associated with network devices 230, in a third configuration section 540. In some implementations, the user may indicate that the user wants the network analysis application to provide a notification about the anomalies to one or more users associated with user device 210 (e.g., and the entity associated with user device 210) and may indicate a notification method (e.g., send a notification to "jsmith@web.com" via an email message and send a notification to "999-222-4567" via a text message). In some implementations, the user may indicate that the user wants the network analysis application to provide a notification about the anomalies to one or more other users.

As further shown in FIG. 5B, the user may identify preferences for providing a comparison, between network devices 230 and other devices, in a fourth configuration section 550. In some implementations, the user may indicate that the user wants the network analysis application to provide a comparison between network device 230 and other similar network devices 230. In some implementations, the user may indicate that the user wants the network analysis application to provide a comparison between network devices 230 and devices providing similar services as network devices 230.

As further shown in FIG. 5B, the user may identify miscellaneous preferences for the network analysis application in a fifth configuration section 560. In some implementations, the user may indicate that the user wants the network analysis application to correlate different types of data (e.g., device data, application data, network data, etc.) associated with network devices 230. In some implementations, the user may indicate that the user wants the network analysis application to predict future behavior of network devices 230 (e.g., based on the trends and/or the historical information).

Once the user has identified the preferences, user interface 510 may allow the user to select a "Submit" option to store the preferences and/or submit the preferences to analysis server 220. Analysis server 220 may then provide, to user device 210, configuration information based on the preferences.

As further shown in FIGS. 5A and 5B, user interface 510 may also allow the user to select a "Back" option to cause user device 210 to provide information regarding the network analysis application. As also shown in FIGS. 5A and 5B, user interface 510 may also allow the user to select a "More Configuration" option to enable the user to identify additional information that may be used to configure the network analysis application.

The number of elements of user interface 510 shown in FIGS. 5A and 5B is provided for explanatory purposes. In practice, user interface 510 may include additional elements, fewer elements, different elements, or differently arranged elements than those shown in FIGS. 5A and 5B.

Figure 6:
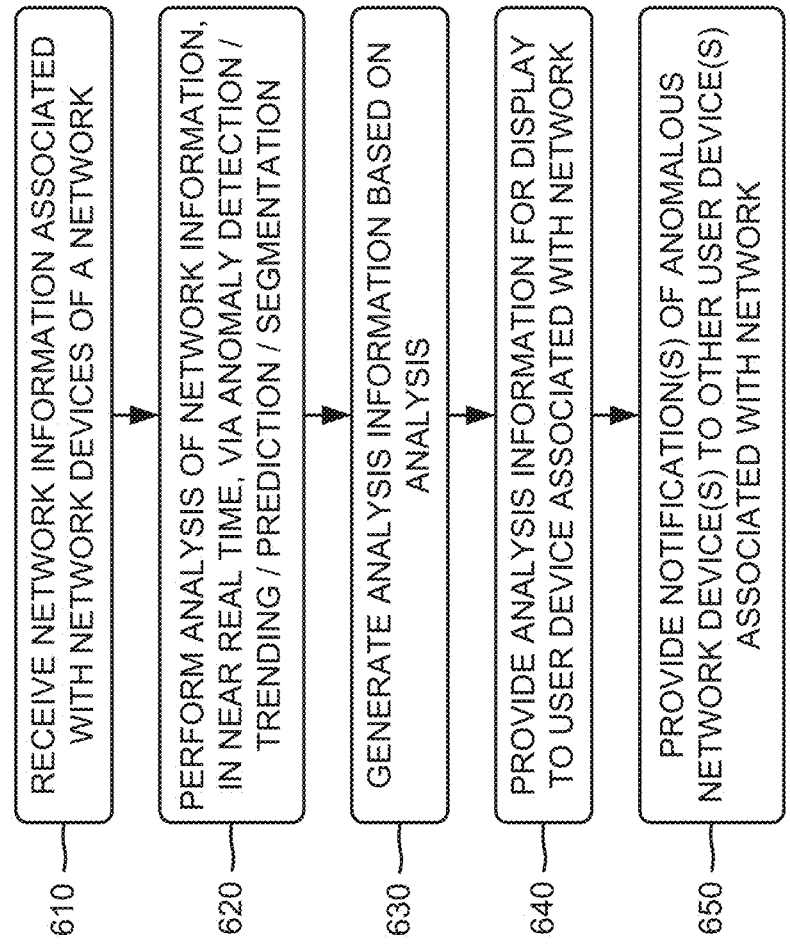
FIG. 6 is a flow chart of an example process for monitoring network devices and analyzing information generated by network devices.

FIG. 6 is a flow chart of an example process 600 for monitoring network devices and analyzing information generated by network devices. In some implementations, one or more process blocks of FIG. 6 may be performed by analysis server 220. In some implementations, one or more process blocks of FIG. 6 may be performed by another device or a group of devices separate from or including analysis server 220, such as user device 210.

As shown in FIG. 6, process 600 may include receiving network information associated with network devices of a network (block 610). For example, multiple network devices 230 may be included in network 240. In some implementations, analysis server 220 may monitor device data associated with network devices 230, or network devices 230 may provide the device data to analysis server 220. In some implementations, a device in network 240 may be configured to monitor and route the device data (or a copy of the device data) to analysis server 220. The device data may include, for example, information associated with components of network devices 230, operation of network devices 230, models of network devices 230, errors generated by network devices 230, etc. In some implementations, network devices 230 may generate application data, and may provide the application data to user device 210 and/or analysis server 220. In some implementations, analysis server 220 may monitor the application data associated with network devices 230. In some implementations, a device in network 240 may be configured to monitor and route the application data (or a copy of the application data) to analysis server 220. The application data may include, for example, data generated based on operation of network devices 230 (e.g., usage information, bandwidth information, throughput information, etc.).

In some implementations, network data may be generated by network devices 230 of network 240 based on usage of network 240. In some implementations, analysis server 220 may monitor the network data associated with network devices 230. In some implementations, a device in network 240 may be configured to monitor and route the network data (or a copy of the network data) to analysis server 220. The network data may include, for example, information associated with usage of network devices 230 and/or network 240, connectivity of network devices 230, provisioning of network devices 230 and/or network 240, etc. In some implementations, the device data, the application data, and the network data may be referred to as network information, and analysis server 220 may receive the network information associated with network devices 230 and/or network 240.

In some implementations, analysis server 220 may preprocess the network information utilizing feature selection (e.g., a process of selecting a subset of relevant features for use in model construction); dimensionality reduction (e.g., a process of reducing a number of random variables under consideration); normalization (e.g., adjusting values measured on different scales to a common scale); data subsetting (e.g., retrieving portions of data that are of interest for a specific purpose); etc.

As further shown in FIG. 6, process 600 may include performing an analysis of the network information, in near real time, real time, or batch time, via anomaly detection, trending, prediction, and/or segmentation (block 620). For example, analysis server 220 may perform an analysis of the network information, in near real time, real time, or batch time, via analytics techniques, such as anomaly detection, trending, prediction, segregation, etc. Performance of the analysis in real time may include analysis server 220 receiving the network information, processing the network information, and generating the analysis information so that network devices 230 may be managed within a particular time (e.g., in milliseconds, microseconds, seconds, etc.). Performance of the analysis in near real time may include the particular time associated with a real time analysis less a time required for analysis server 220 to generate the analysis information based on the network information. In some implementations, analysis server 220 may perform an analysis of the network information over time (e.g., not in real time or near real time). In some implementations, analysis server 220 may utilize anomaly detection techniques to identify one or more anomalous network devices 230 based on the network information. Anomaly detection may generally include identifying items, events, or observations that do not conform to an expected pattern or other items, events, or observations in a dataset. In some implementations, analysis server 220 may determine normal behavior patterns associated with network devices 230, over time and based on the network information. For example, analysis server 220 may determine that network devices 230 have a particular usage pattern, that network devices 230 have a particular connectivity pattern, that network devices 230 generate particular application data, etc. Analysis server 220 may compare current network information with the determined normal behavior patterns in order to detect anomalous network devices 230 and/or to predict abnormal behavior of network devices 230 before the abnormal behavior occurs (e.g., so that preventative action may be taken). In some implementations, analysis server 220 may utilize unsupervised anomaly detection techniques, supervised anomaly detection techniques, or semi-supervised anomaly detection techniques to identify one or more anomalous network devices 230 based on the network information. Anomaly detection may enable an entity (e.g., a service provider) to identify potential faults and/or failures in network device 230, and to repair or correct the faults and/or failures prior to a network outage.

In some implementations, analysis server 220 may utilize trending techniques (or trend analysis) to determine trends in usage, connectivity, and/or provisioning activities of network devices 230; trends in the device data; and/or trends in the application data. Trending techniques may generally include collecting information and attempting to determine a pattern, or a trend, in the information. Trending techniques may be used to predict future events and/or to estimate uncertain events in the past. In some implementations, analysis server 220 may analyze the usage, connectivity, and/or provisioning activities of network devices 230, the device data, and/or the application data, for a particular time period, in order to identify the trends in the usage, connectivity, and/or provisioning activities, the device data, and/or the application data associated with network devices 230. The trending technique may enable an entity (e.g., a service provider) to predict when network devices 230 will need repair, and to schedule maintenance accordingly.

In some implementations, analysis server 220 may utilize prediction techniques (or predictive analytics) to determine future behavior of network devices 230 based on historical network information and/or correlated network information (e.g., location information associated with network devices 230, destination addresses of packets generated by network devices 230, radio frequency (RF) data associated with network devices 230, etc.). Prediction techniques may generally include a variety of techniques (e.g., statistics, modeling, machine learning, data mining, etc.) that analyze current and historical information to make predictions about future, or otherwise unknown, events. In some implementations, analysis server 220 may determine normal behavior patterns associated with network devices 230, over time and based on the network information. Analysis server 220 may utilize the determined normal behavior patterns in order to predict future behavior of network devices 230 (e.g., to predict future usage, connectivity, and provisioning activities of network devices 230). The prediction techniques may enable an entity (e.g., a service provider) to predict when network devices 230 will need repair, and to schedule maintenance accordingly.

In some implementations, analysis server 220 may utilize segmentation techniques to determine groups of network devices 230 that are similar in behavior (e.g., different types of network devices 230 may have similar usage and connectivity behavior). Segmentation techniques may generally include dividing or clustering items into groups that are similar in specific ways relevant to the items, such as the behavior of the items. In some implementations, analysis server 220 may analyze the usage, connectivity, and/or provisioning activities of network devices 230, the device data, and/or the application data, for a particular time period, in order to identify similarities in the usage, connectivity, and/or provisioning activities, the device data, and/or the application data associated with network devices 230. Analysis server 220 may utilize the determined similarities to group network devices 230 into groups of devices with similar behavior. In some implementations, analysis server 220 may analyze the usage, connectivity, and/or provisioning activities of network devices 230, the device data, and/or the application data, for a particular time period, in order to determine correlations between different types of data (e.g., between usage data and the application data, between the usage data and the connectivity data, etc.). The segmentation technique may enable an entity (e.g., a service provider) to compare similar network devices 230 in order to determine when a particular network device 230 will need repair.

In some implementations, analysis server 220 may perform the analysis of the network information via one or more of the anomaly detection techniques, the trending techniques, the prediction techniques, the segregation techniques, and/or other analytics techniques. In some implementations, a user of user device 210 may specify which analytics techniques to perform on the network information. In some implementations, types of analytics techniques performed by analysis server 220 on the network information may be based on a type of account of the user, processing power of analysis server 220, an amount of money paid by the user, etc.

As further shown in FIG. 6, process 600 may include generating analysis information based on the analysis of the network information (block 630). For example, analysis server 220 may generate analysis information based on the analysis of the network information (e.g., the device data, the application, and/or the network data) associated with network devices 230. In some implementations, the analysis information may include information generated by performance of the anomaly detection techniques, the trending techniques, the prediction techniques, and/or the segmentation techniques by analysis server 220. In some implementations, analysis server 220 may store the analysis information in memory (e.g., memory 330, FIG. 3) associated with analysis server 220.

In some implementations, the analysis information may include a comparison of analyzed network information, associated with network devices 230 of a first portion of network 240, and analyzed network information, associated with network devices 230 of a second portion of network 240. Such implementations may enable a service provider to determine how the first portion's network devices 230 are performing in comparison to similar network devices 230 of the second portion of network 240, and vice versa. In some implementations, analysis server 220 may process the analysis information by filtering patterns in the analysis information, performing visualization on the analysis information, interpreting patterns in the analysis information, etc.

In some implementations, analysis server 220 may combine the results of the different analysis techniques (e.g., anomaly detection, trending, prediction, segregation, etc.)

together to generate the analysis information. In some implementations, analysis server 220 may assign weights to different results of the different analysis techniques, and may combine the weighted results together to generate the analysis information. In some implementations, the analysis information may include information identifying anomalies in the application data (e.g., data usage from particular network devices 230 may be unusually high); information identifying anomalies in the device data (e.g., error codes may be generated by particular network devices 230); information identifying anomalies in the network data (e.g., low bandwidth availability by particular network devices 230); information identifying trends associated with the application data received from network devices 230) (e.g., the application data may indicate that a portion of network 240 experiences congestion at particular times of the day); information identifying comparisons between similar network devices 230 (e.g., application data from a network device 230 at a first portion of network 240 may be compared with application data from a network device 230 at a second portion of network 240); information identifying predictions for network devices 230 (e.g., information associated with a particular network device 230 may indicate that the particular network device 230 may need to be repaired in one week); etc.

As further shown in FIG. 6, process 600 may include providing the analysis information for display to a user device associated with the network (block 640). For example, analysis server 220 may provide the analysis information, for display, to user device 210 associated with analysis server 220. In some implementations, analysis server 220 may generate a dashboard of user interfaces that include the analysis information, and may provide the dashboard to user device 210. In some implementations, the dashboard may include information identifying anomalous network devices 230; information identifying trends in the network data, the device data, and/or the application data associated with network devices 230; information identifying predicted future behavior (e.g., for the network data, the device data, and/or the application data) associated with network devices 230; information comparing behavior of network devices 230 to similar network devices 230; etc.

In some implementations, the dashboard may include information that highlights problems with network devices 230 (e.g., anomalous network devices 230, network devices 230 that are tampered with or stolen, problem usage trends associated with particular network devices 230, etc.). In such implementations, the dashboard may provide relevant predictive and diagnostic information, associated with network devices 230, in a user interface. This may alert a user (e.g., a service provider) about the problems with network devices 230 so that the user may take appropriate actions to correct the problems.

In some implementations, the dashboard may aid the user in daily management and operation of network devices 230, and may enable the user to make business decisions associated with network devices 230. In some implementations, the dashboard may enable the user to control operating costs associated with network devices 230 by alerting the user about required maintenance of problem network devices 230, by identifying network issues associated with network devices 230, etc. In some implementations, the dashboard may enable the user to control asset losses and costs due to data security breaches. For example, the user may determine that a network device 230 is being stolen or tampered with if a location of network device 230 changes, a connectivity pattern of network device 230 changes, etc. In another example, the entity may determine data security breaches based on packet inspection, by analysis server 220, of the application data received from network devices 230 (e.g., with user's permission). In some implementations, the dashboard may enable the user to comply with legal regulations and/or to receive regulatory approval for network devices 230. For example, the insight provided by the dashboard into the performance of network devices 230 and/or network 240 may help the user receive approval (e.g., from regulatory agencies) for spending decisions associated with network devices 230, and may also prevent legal liabilities associated with network devices 230.

As further shown in FIG. 6, process 600 may include providing one or more notifications of anomalous network device(s) to other device(s) associated with the network (block 650). For example, analysis server 220 may provide one or more notifications, associated with one or more anomalous network devices 230, to other devices (e.g., user devices 210) associated with network 240. In some implementations, the user may designate one or more employees to receive the notifications from the analysis server 220 via a variety of notification methods (e.g., an email message, a text message, a telephone call, a voicemail message, etc.). For example, if the entity designated Bob to receive the notification (e.g., via Bob's email address, "bob@website.com") and Susan to receive the notification (e.g., via a text message to Susan's smart phone number "222-445-6788"), analysis server 220 may provide the notification to a user device 210 associated with Bob via an email message to "bob@website.com," and may provide the notification to a user device 210 associated with Susan via a text message to "222-445-6788."

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
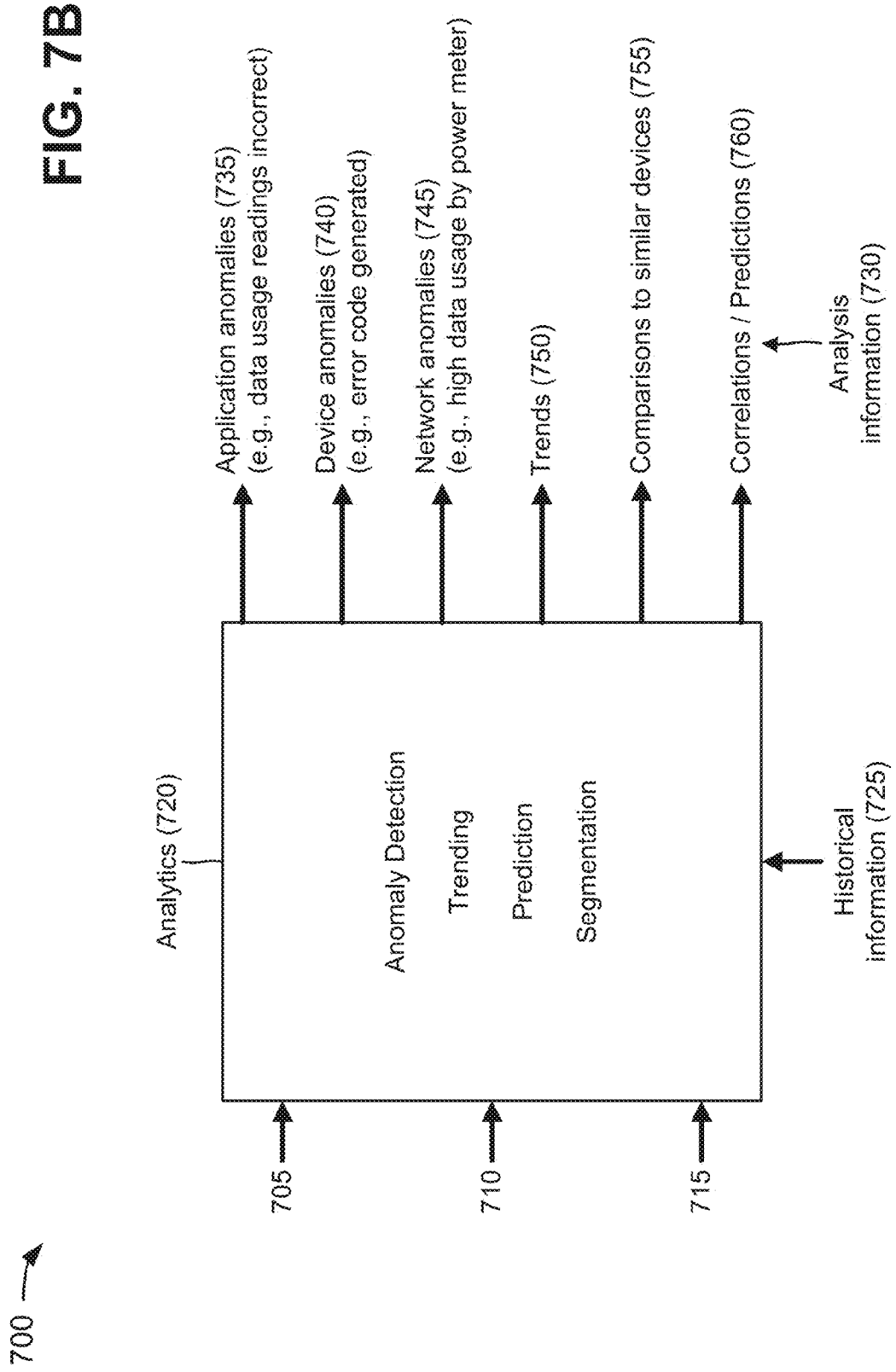

FIGS. 7A-7G are diagrams of an example 700 relating to example process 600 shown in FIG. 6. As shown in FIG. 7A, assume that multiple network devices 230 (e.g., a router 230-1, . . . , a base station 230-N(N>1)) are managed and/or operated by a service provider associated with network 240. Router 230-1 may generate application data 705-1 (e.g., information identifying gigabytes of data used) based on operation of router 230-1, and may provide application data 705-1 to user device 210 and analysis server 220, via network 240. Base station 230-N may generate application data 705-N (e.g., information identifying gigabytes of data used) based on operation of base station 230-N, and may provide application data 705-N to user device 210 and analysis server 220, via network 240. Other network devices 230 may generate application data 705, and may provide application data 705 to user device 210 and analysis server 220, via network 240.

As further shown in FIG. 7A, router 230-1 may generate device data 710-1 (e.g., indicating that router 230-1 has been in use for two years) based on operation of router 230-1, and may provide device data 710-1 to user device 210 and analysis server 220, via network 240. Base station 230-N may generate device data 710-N (e.g., a base station error code) based on operation of base station 230-N, and may provide device data 710-N to user device 210 and analysis server 220, via network 240. Other network devices 230 may generate device data 710, and may provide device data 710 to user device 210 and analysis server 220, via network 240. As further shown in FIG. 7A, utilization of network devices 230 and/or network 240 may generate network data 715, and network 240 may provide network data 715 to analysis server 220. Network data 715 may include information associated with usage of network devices 230 and/or network 240, information associated with connectivity of network devices 230 and/or network 240, information associated with provisioning of network devices 230 and/or network 240, etc.

As shown in FIG. 7B, analysis server 220 may include an analytics component 720 that receives application data 705, device data 710, network data 715, and/or historical information 725 (e.g., historical application data 705, device data 710, network data 715, etc. previously provided by network devices 230). Analytics component 720 may perform analytics techniques (e.g., anomaly detection, trending, prediction, segmentation, etc.) on application data 705, device data 710, network data 715, and/or historical information 725 to generate analysis information 730. As further shown in FIG. 7B, analysis information 730 may include anomalies 735 associated with application data 705 (e.g., network device 230 readings that are incorrect); anomalies 740 associated with device data 710 (e.g., error code generated by base station 230-N); anomalies 745 associated with network data 715 (e.g., high data usage by router 230-1); trends 750 associated with application data 705, device data 710, and/or network data 715; comparisons 755 of network devices 230 with similar devices (e.g., network devices of another network or another portion of network 240); correlations and/or predictions 760 based on application data 705, device data 710, and/or network data 715; etc. In some implementations, analysis information 730 may include network roaming patterns associated with network devices 230, network usage (e.g., base station 230-N usage), heat maps associated with network devices 230, analytics on fault tolerance (e.g., wireless backup) utilized by network devices 230, results of deep packet inspection of application data 705, etc.

Figure 7C:
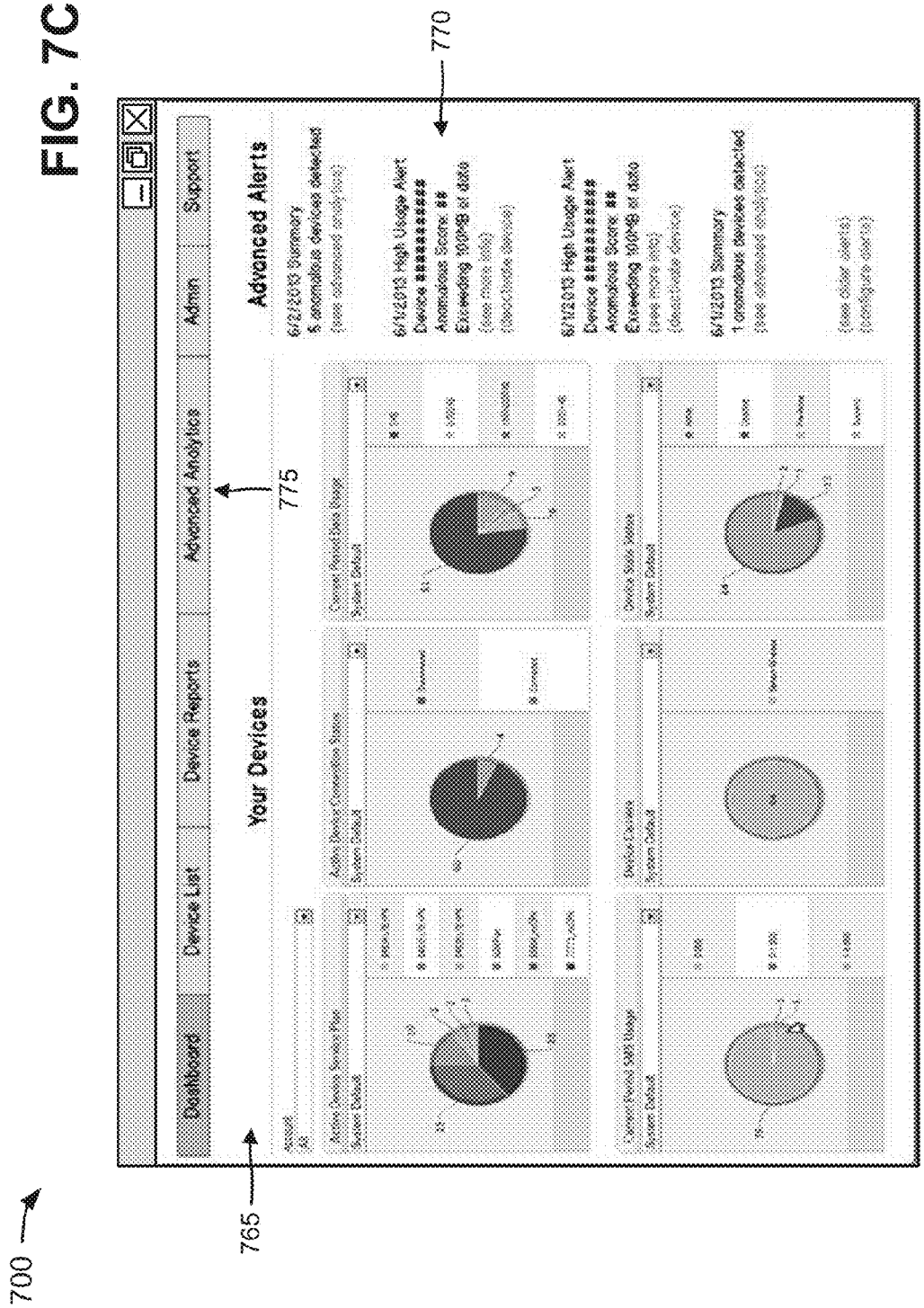

Analysis server 220 may utilize analysis information 730 to generate a first dashboard user interface 765, as shown in FIG. 7C. Analysis server 220 may provide user interface 765, for display, by user device 210 so that a user (e.g., an employee/contractor of a service provider) may review analysis information 730. As shown in FIG. 7C, user interface 765 may include information associated with network devices 230 (e.g., Your Devices), such as service plans, connection status, data usage, short message service (SMS) usage, carrier information, state status, etc. associated with network devices 230. User interface 765 may also include a section 770 that displays alerts associated with particular network devices 230 at particular times. For example, section 770 may indicate that, on Jun. 2, 2013, five anomalous network devices 230 were detected, and that, on Jun. 1, 2013, a particular network device 230 exceeded 100 megabits (MB) of data usage. As further shown in FIG. 7C, user interface 765 may include an "Advanced Analytics" tab 775 that, when selected, may provide additional analysis information 730 for display.

Figure 7D:
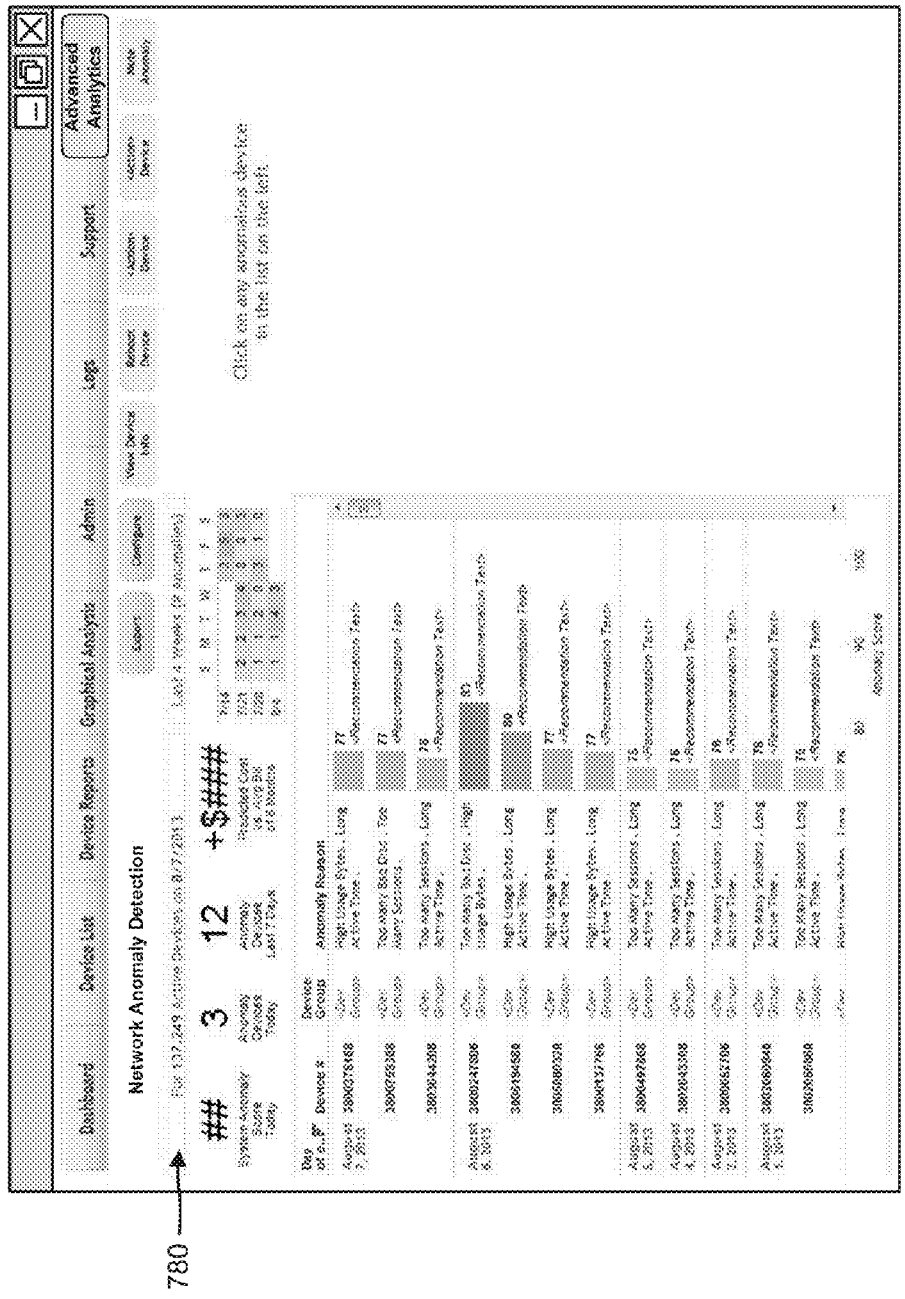

Assume that "Advanced Analytics" tab 775 is selected, and that the selection causes analysis server 220 to provide a second dashboard user interface 780, for display, by user device 210, as shown in FIG. 7D. User interface 780 may include a first section that provides information associated with network devices 230 on a particular day. For example, the first section may include information indicating that, on Aug. 7, 2013, the service provider has "137,249" active network devices 230; an anomaly score for the service provider on Aug. 7, 2013; a number (e.g., three) of anomalous network devices 230 detected on Aug. 7, 2013; a number (e.g., twelve) of anomalous network devices 230 detected over the last seven days; a predicted cost for the service provider for the next six months; etc. In some implementations, the anomaly score may be calculated by analysis server 220 based on a number of anomalous network devices 230 detected by analysis server 220 on Aug. 7, 2013; reasons associated with the anomalies detected for the anomalous network devices 230; etc.

As further shown in FIG. 7D, user interface 780 may include a second section that provides information associated with a number of anomalous network devices 230 detected over the last four weeks (e.g., in a calendar format). User interface 780 may include a third section that provides detailed information associated with the anomalous network devices 230 detected over a period of time. For example, the third section may include dates associated with when the anomalous network devices 230 are detected (e.g., Aug. 7, 2013, Aug. 6, 2013, etc.); device numbers associated with the anomalous network devices 230 (e.g., "3800376188," "3800759388," etc.); anomaly reasons associated with the anomalous network devices 230 (e.g., high data usage, too many bad discs, too many sessions, etc.); and/or graphs associated with the anomalous network devices 230.

Figure 7E:
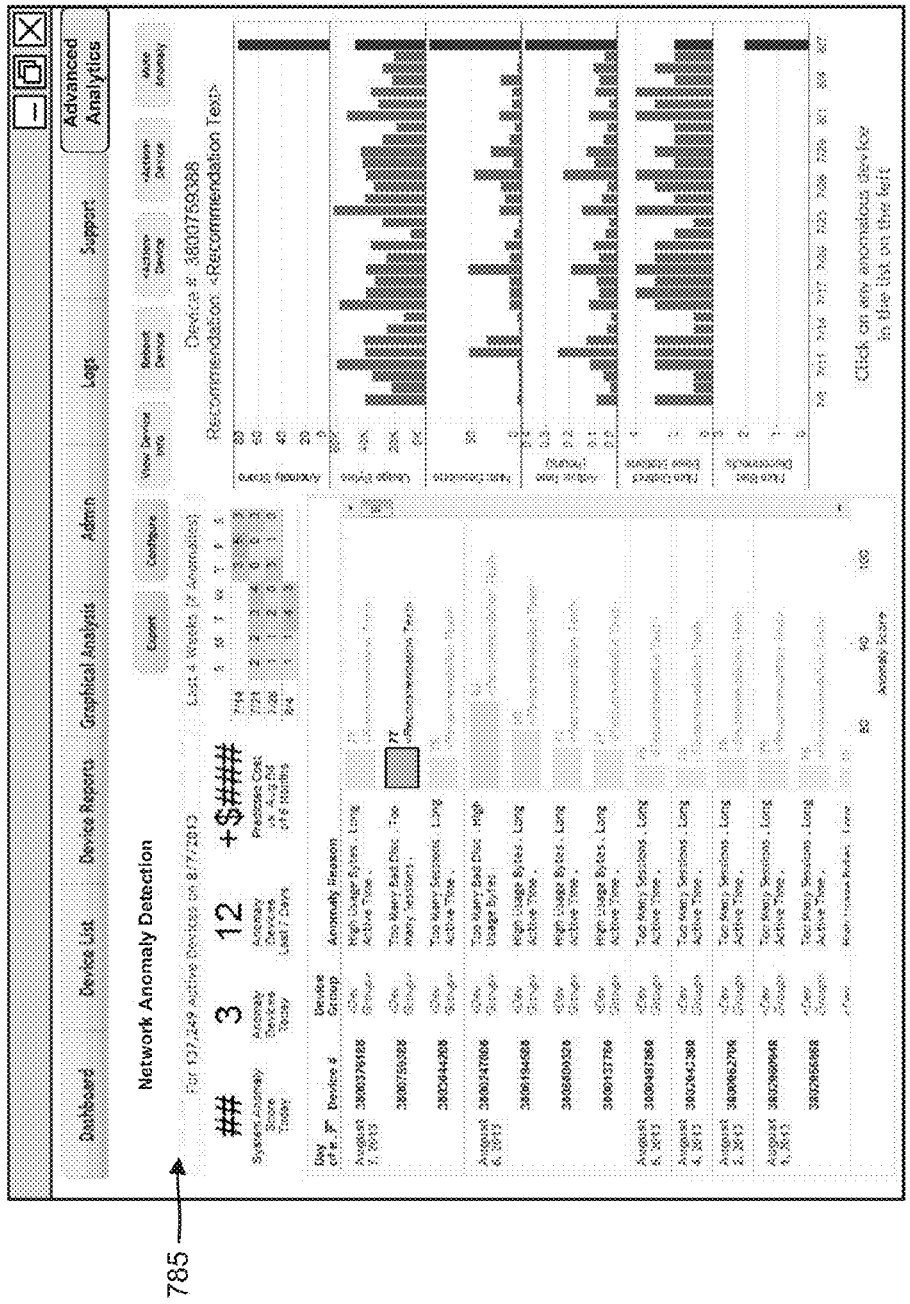

If one of the anomalous power meters 210 listed in the third section of user interface 780 is selected, analysis server 220 may provide a third dashboard user interface 785, for display, by user device 210, as shown in FIG. 7E. User interface 785 may include the first section, the second section, and the third section of user interface 780, and may include a fourth section that provides information associated with the selected anomalous network device 230. For example, the fourth section may include information identifying an anomaly score, data usage, a number of sessions, an active time, a number of distinct base stations, a number of bad disconnects, etc. associated with the selected anomalous network device 230. As further shown in FIG. 7E, user interface 785 may include mechanisms (e.g., tabs, icons, links, etc.) that enable the user to return to user interface 765 (e.g., FIG. 7C), view a list of network devices 230, view reports associated with network devices 230, perform a graphical analysis of analysis information 730, export analysis information 730, configure one or more network devices 230, view device data associated with a particular network device 230, reboot a particular network device 230, etc.

Figure 7F:

As shown in FIG. 7F, analysis server 220 may provide a fourth dashboard user interface 790, for display, by user device 210. User interface 790 may include a section that provides a number of anomalies (e.g., anomalous network devices 230) detected on a particular day. For example, the section may indicate that, on February 28, twenty-two anomalous network devices 230 were detected. User interface 790 may enable a user to view information associated with network devices 230 based on scenario, device group, geography, etc. For example, as shown in FIG. 7F, when the information associated network devices 230 is viewed based on scenario, user interface 790 may include information associated with potential overages (e.g., by eleven network devices 230), potential data channel issues (e.g., by nine network devices 230), potential movement of fixed assets, etc.

Figure 7G:
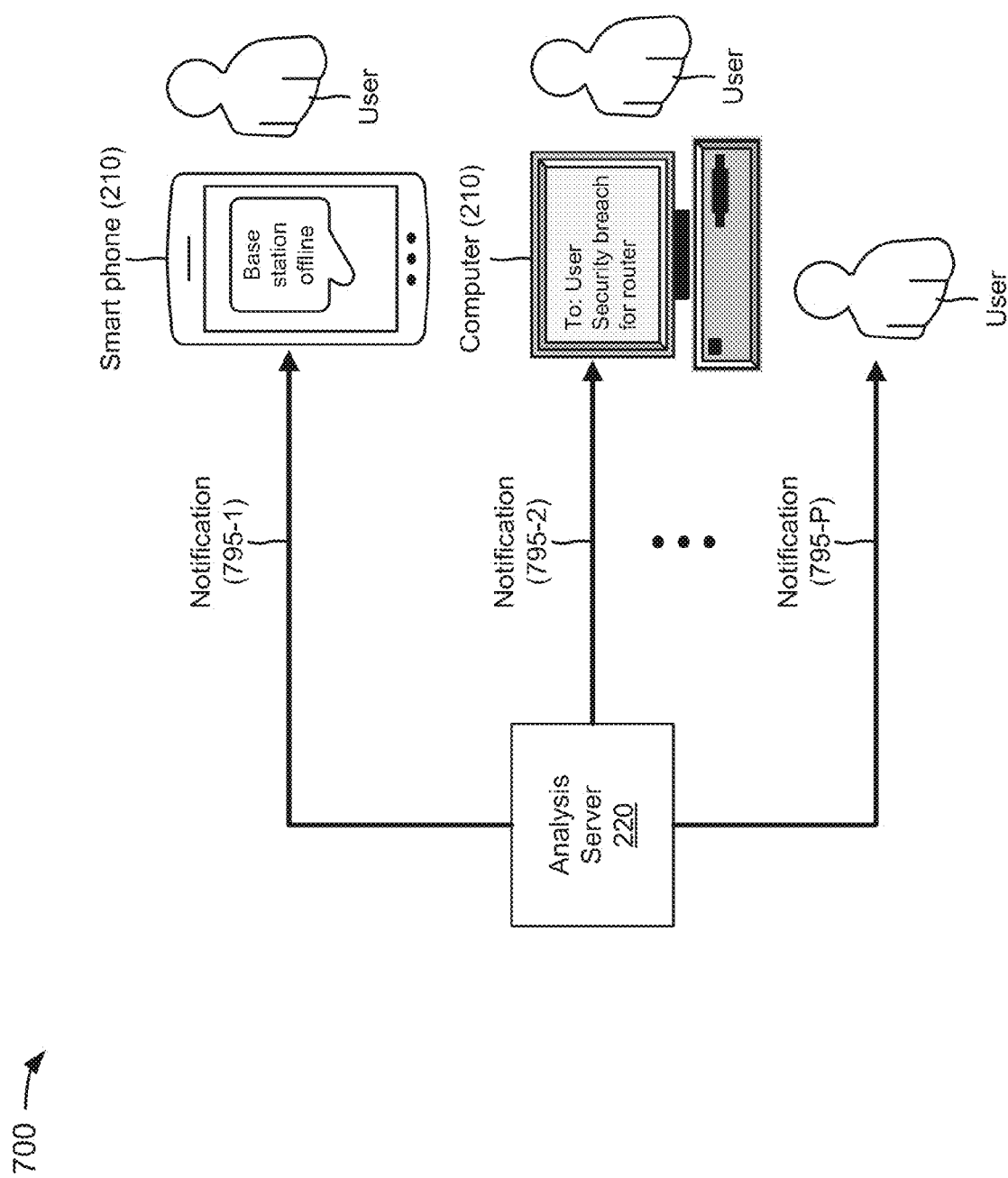

As shown in FIG. 7G, analysis server 220 may generate notifications 795-1 through 795-P (P≥1) based on analysis information 730. For example, as shown in FIG. 7G, analysis server 220 may provide notification 795-1 to a smart phone associated with a user (e.g., an employee of the service provider). Notification 795-1 may include a text message that indicates that a particular base station is offline. Analysis server 220 may provide notification 795-2 to a computer associated with another user (e.g., another employee of the service provider). Notification 795-2 may include an email message that indicates a security breach for a particular router. Analysis server 220 may provide notification 795-P for display to still another user (e.g., another employee of the service provider). Notification 795-P may include information (e.g., provided via user interface 765, FIG. 7C) that indicates high data usage for a particular network device 230.

As indicated above, FIGS. 7A-7G are provided merely as an example. Other examples are possible and may differ from what was described with regard to FIGS. 7A-7G. In some implementations, the various operations described in connection with FIGS. 7A-7G may be performed automatically or at the request of a user.

Systems and/or methods described herein may provide a framework for monitoring and managing network devices of a network, and the framework may scale to any number of network devices. The systems and/or methods may enable a service provider to manage the network devices based on an analysis (e.g., anomaly detection, diagnosis, trending, prediction, segmentations, prognostics, etc.) of information generated by the network devices. The systems and/or methods may enable the service provider to perform condition-based maintenance on malfunctioning network devices, which may significantly reduce costs for the service provider. The systems and/or methods may monitor the network devices for the service provider, which may also reduce costs for the service provider.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, information associated with network devices of a network,
       the information associated with the network devices including one or more of:
           device information associated with components of the network devices,
           application information generated by the network devices, or
           network information associated with interactions of the network devices;
   performing, by the device, an analysis of the information associated with the network devices via one or more analytics techniques in near real time;
   generating, by the device, analysis information based on the analysis of the information associated with the network devices,
       the analysis information including information associated with one or more network devices, of the network devices, identified as being anomalous based on the information associated with the network devices; and
   providing, by the device, the analysis information for display.

2. The method of claim 1, further comprising:
   providing one or more notifications associated with the analysis information to one or more devices associated with a service provider associated with the network devices.

3. The method of claim 2, where the one or more notifications include information associated with one or more network devices, of the network devices, identified as being anomalous based on the analysis of the information associated with the network devices.

4. The method of claim 1, where the network information includes one or more of:
   information associated with usage of the network devices,
   information associated with connectivity of the network devices, or information associated with provisioning of the network devices.

5. The method of claim 1, where the one or more analytics techniques include one or more of:
- an anomaly detection technique to identify one or more anomalous network devices, of the network devices, based on the information associated with the network devices,
- a trending technique to identify one or more trends for the network devices based on the information associated with the network devices,
- a prediction technique to predict one or more behaviors of the network devices based on the information associated with the network devices, or
- a segmentation technique to group one or more network devices, of the network devices, into groups based on the information associated with the network devices.

6. The method of claim 1, where the analysis information includes one or more of:
- information associated with one or more anomalies identified in the device information, the application information, or the network information,
- information associated with one or more trends identified in the device information, the application information, or the network information,
- information associated with one or more comparisons of the device information, the application information, or the network information, associated with the network devices, and device information, application information, or network information associated with other network devices, or
- information associated with one or more predictions determined based on the device information, the application information, or the network information.

7. The method of claim 1, where providing the analysis information for display further comprises:
- generating a dashboard user interface that includes the analysis information; and
- providing the dashboard user interface for display.

8. A device, comprising:
- one or more processors to:
  - receive information associated with a plurality of network devices of a network,
    - the information associated with the plurality of network devices including one or more of:
      - device information associated with components of the plurality of network devices,
      - application information generated by the plurality of network devices, or
      - network information associated with interactions of the plurality of network devices;
  - perform an analysis of the information associated with the plurality of network devices via one or more analytics techniques in near real time;
  - generate analysis information based on the analysis of the information associated with the plurality of network devices,
    - the analysis information including information associated with one or more network devices, of the plurality of network devices, identified as being anomalous based on the information associated with the plurality of network devices;
  - store the analysis information; and
  - provide the analysis information for display.

9. The device of claim 8, where the one or more processors are further to:
- provide at least one notification associated with the analysis information to at least one other device, associated with a service provider associated with the plurality of network devices, via an email message, a text message, a voicemail message, or a voice call.

10. The device of claim 9, where the at least one notification includes information associated with one or more network devices, of the plurality of network devices, identified as being anomalous based on the analysis of the information associated with the plurality of network devices.

11. The device of claim 8, where the network information includes one or more of:
- information associated with usage of the plurality of network devices,
- information associated with connectivity of the plurality of network devices, or
- information associated with provisioning of the plurality of network devices.

12. The device of claim 8, where the one or more analytics techniques include one or more of:
- an anomaly detection technique to identify one or more anomalous network devices, of the plurality of network devices, based on the information associated with the plurality of network devices,
- a trending technique to identify one or more trends for the plurality of network devices based on the information associated with the plurality of network devices,
- a prediction technique to predict one or more behaviors of the plurality of network devices based on the information associated with the plurality of network devices, or
- a segmentation technique to group one or more network devices, of the plurality of network devices, into groups based on the information associated with the plurality of network devices.

13. The device of claim 8, where the analysis information includes one or more of:
- information associated with one or more anomalies identified in the device information, the application information, or the network information,
- information associated with one or more trends identified in the device information, the application information, or the network information,
- information associated with one or more comparisons of the device information, the application information, or the network information, associated with the plurality of network devices, and device information, application information, or network information associated with other network devices, or
- information associated with one or more predictions determined based on the device information, the application information, or the network information.

14. The device of claim 8, where, when providing the analysis information for display, the one or more processors are further to:
- generate a dashboard user interface that includes the analysis information, and
- provide the dashboard user interface for display.

15. A computer-readable medium for storing instructions, the instructions comprising:
- one or more instructions that, when executed by one or more processors of a device, cause the one or more processors to:
  - receive information associated with network devices of a network,
    - the information associated with the network devices including a plurality of:

device information associated with hardware components of the network devices,
application information generated by the network devices, or
network information associated with interactions of the network devices with one or more user devices;
perform an analysis of the information associated with the network devices via one or more analytics techniques in near real time;
generate analysis information based on the analysis of the information associated with the network devices; and
provide the analysis information for display.

16. The computer-readable medium of claim 15, where the instructions further comprise:
one or more instructions that, when executed by the one or more processors, cause the one or more processors to:
provide one or more notifications associated with the analysis information to one or more other devices associated with a service provider associated with the network devices.

17. The computer-readable medium of claim 16, where the one or more notifications include:
information associated with one or more network devices, of the network devices, identified as being anomalous based on the analysis of the information associated with the network devices.

18. The computer-readable medium of claim 15, where the network information includes a plurality of:
information associated with usage of the network devices,
information associated with connectivity of the network devices, or
information associated with provisioning of the network devices.

19. The computer-readable medium of claim 15, where the one or more analytics techniques include a plurality of:
an anomaly detection technique to identify one or more anomalous network devices, of the network devices, based on the information associated with the network devices,
a trending technique to identify one or more trends for the network devices based on the information associated with the network devices,
a prediction technique to predict one or more behaviors of the network devices based on the information associated with the network devices, or
a segmentation technique to group one or more network devices, of the network devices, into groups based on the information associated with the network devices.

20. The computer-readable medium of claim 15, where the analysis information includes a plurality of:
information associated with one or more anomalies identified in the device information, the application information, or the network information,
information associated with one or more trends identified in the device information, the application information, or the network information,
information associated with one or more comparisons of the device information, the application information, or the network information, associated with the network devices, and device information, application information, or network information associated with other network devices, or
information associated with one or more predictions determined based on the device information, the application information, or the network information.

\* \* \* \* \*